United States Patent
Durkin et al.

(10) Patent No.: US 8,781,647 B2
(45) Date of Patent: Jul. 15, 2014

(54) SYSTEM AND METHOD FOR DECREASING VEHICLE SPEED FROM A REMOTE LOCATION

(75) Inventors: Thomas Richard Durkin, Oxford, MI (US); Richard B. Jess, Haslett, MI (US); John Douglas Tursell, White Lake Township, MI (US)

(73) Assignee: GM Global Technology Operations LLC

( * ) Notice: Subject to any disclaimer, the term of this patent is extended or adjusted under 35 U.S.C. 154(b) by 697 days.

(21) Appl. No.: 12/984,890

(22) Filed: Jan. 5, 2011

(65) Prior Publication Data

US 2012/0173046 A1 Jul. 5, 2012

(51) Int. Cl.
 *G06F 7/00* (2006.01)
 *B60W 10/10* (2012.01)

(52) U.S. Cl.
 USPC .................... 701/2; 701/51; 477/112

(58) Field of Classification Search
 USPC ............. 701/22, 2, 51–53, 70, 93; 180/65.28; 340/901–902; 477/112
 See application file for complete search history.

(56) References Cited

U.S. PATENT DOCUMENTS

| 6,707,392 B1 * | 3/2004 | Melton | 340/902 |
| 8,412,398 B2 * | 4/2013 | Xia et al. | 701/22 |
| 2007/0115101 A1 * | 5/2007 | Creekbaum et al. | 340/426.22 |

FOREIGN PATENT DOCUMENTS

| DE | 19846788 A1 | 6/2000 |
| DE | 102009015055 A1 | 12/2009 |
| WO | WO9830421 A1 | 7/1998 |

\* cited by examiner

*Primary Examiner* — Yonel Beaulieu

(57) ABSTRACT

A control system for a vehicle includes a communication module and a vehicle stop module. The communication module receives a command from a vehicle services provider (VSP) to decrease a speed of the vehicle to a desired speed, wherein the VSP is located remotely with respect to the vehicle. In response to the received command, the vehicle stop module decreases the speed of the vehicle to the desired speed by controlling at least one of a transmission, an electronic parking brake, and electronically assisted brakes.

20 Claims, 4 Drawing Sheets

SYSTEM AND METHOD FOR DECREASING VEHICLE SPEED FROM A REMOTE LOCATION

FIELD

The present disclosure relates to vehicle control systems and more particularly to a system and method for decreasing vehicle speed from a remote location.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles may include communication systems for communicating with a remote third party such as a vehicle services provider (VSP). The VSP may monitor vehicle operation and periodically inform a driver about a status of the vehicle (e.g., when maintenance is required). Additionally, when requested by a driver of the vehicle, the VSP may exchange information with the driver and/or control various components of the vehicle. For example, the VSP may monitor impact sensors to detect when the vehicle has been in an accident. The VSP may then communicate with a driver of the vehicle to determine whether the driver is injured. Additionally, for example, the VSP may unlock the doors of the vehicle at an owner's request, such as when the owner has locked himself out of the vehicle.

SUMMARY

A control system for a vehicle includes a communication module and a vehicle stop module. The communication module receives a command from a vehicle services provider (VSP) to decrease a speed of the vehicle to a desired speed, wherein the VSP is located remotely with respect to the vehicle. The vehicle stop module, in response to the received command, decreases the speed of the vehicle to the desired speed by controlling at least one of a transmission, an electronic parking brake, and electronically assisted brakes.

A method for controlling a vehicle includes receiving a command from a vehicle services provider (VSP) to decrease a speed of the vehicle to a desired speed, wherein the VSP is located remotely with respect to the vehicle, and in response to the received command, decreasing the speed of the vehicle to the desired speed by controlling at least one of a transmission, an electronic parking brake, and electronically assisted brakes.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
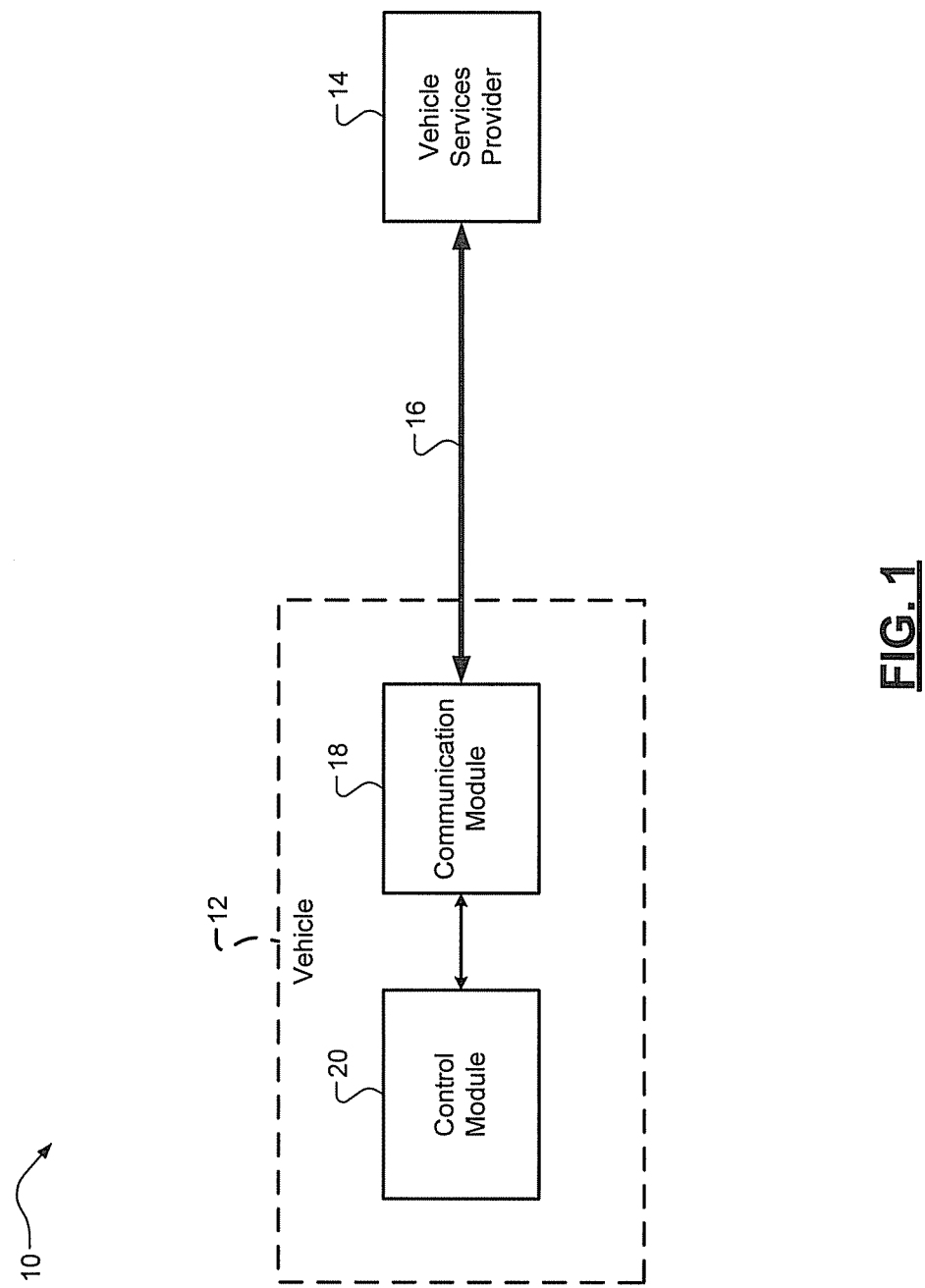
FIG. 1 is a functional block diagram of a system for communication between a vehicle and a vehicle services provider (VSP) according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

At a driver's request, a vehicle services provider (VSP) may exchange information with the driver and/or control various components of a vehicle. For example, the VSP may provide directions to a point of interest requested by the driver. Additionally, for example, the VSP may unlock doors of the vehicle when an owner is locked out of the vehicle. The VSP, however, may also be used to assist in locating and recovering the vehicle when the vehicle is reported stolen. For example, the VSP may monitor a location of the vehicle to assist law enforcement authorities in tracking and recovering the vehicle.

Accordingly, a system and method are presented for decreasing a speed of a vehicle from a remote location. Specifically, the system or method may be implemented in a vehicle to allow a VSP to safely bring the vehicle to a stop. For example, the capability of a VSP to safely bring a stolen vehicle to a stop may further assist law enforcement authorities in recovering the vehicle. The system and method may first receive a command from a VSP to decrease the vehicle speed to a desired speed. For example, the desired speed may be zero miles per hour (mph). The command from the VSP to decrease the vehicle speed may be in response to a request by the owner of the vehicle and/or in response to a request by law enforcement authorities, In response to the received command, the system and method may then decrease the vehicle speed to the desired speed by controlling at least one of a plurality of vehicle components. For example, the plurality of vehicle components may include an electronic parking brake, a transmission, and electronically assisted brakes. For example only, the system and method may shift the transmission into neutral preventing drive torque from being transferred to wheels of the vehicle. The system and method may also decrease the vehicle speed to the desired speed using other suitable methods such as controlling engine torque.

Referring now to FIG. 1, a system 10 for communication between a vehicle 12 and a VSP 14 is shown. The VSP 14 may be located remotely in relation to the vehicle 12. The vehicle 12 and the VSP 14 may communicate via a communication channel 16. For example, the communication channel 16 may include a radio frequency (RF) channel. The communication channel 16 may also be another suitable type of communication channel.

The vehicle 12 may include a communication module 18 and a control module 20. The communication module 18 controls the transmission of information/requests to the VSP 14 and receiving of information/commands from the VSP 14. The vehicle 12 may also include a global positioning satellite (GPS) system (not shown) and/or a telemetry system (not shown). For example, the GPS system and/or the telemetry system may be used by the VSP 14 for navigation and/or for tracking a location of the vehicle 12.

The control module 20 communicates with the communication module 18. Specifically, the control module 20 may execute the commands received by the communication module 18 and may generate the information transmitted by the communication module 18. While the communication module 18 is shown to be separate from the control module 20, the communication module 18 may also be integrated into the control module 20.

Figure 2:
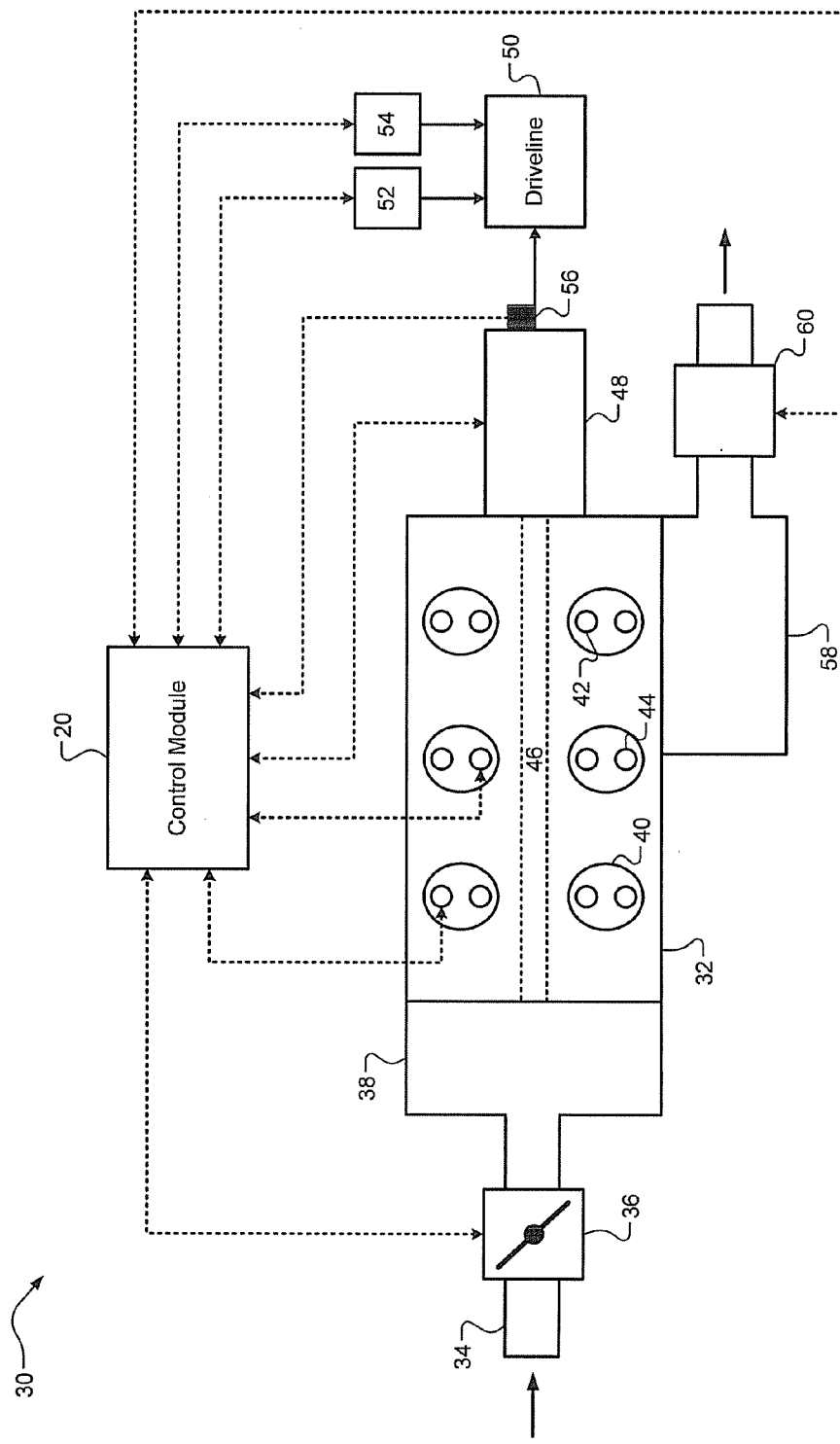
FIG. 2 is a functional block diagram of an engine system of the vehicle according to one implementation of the present disclosure.

Referring now to FIG. 2, the vehicle 12 includes an engine system 30. The engine system 30 includes an engine 32 that generates drive torque to propel the vehicle 12. The engine 32 may include a spark ignition (SI) engine, a compression ignition (CI) engine (e.g., a diesel engine), or a homogeneous charge compression ignition (HCCI) engine. The engine system 30 may also include another suitable type of engine and/or additional components such as an electric motor and a battery system.

The engine 32 draws air into an intake manifold 38 through an induction system 34 that may be regulated by a throttle 36. For example, the throttle 36 may be electrically controlled using electronic throttle control (ETC). The air in the intake manifold 38 may be distributed to a plurality of cylinders 40 and combined with fuel from a plurality of fuel injectors 42 to create an air/fuel (NE) mixture. While six cylinders are shown, the engine 32 may include other numbers of cylinders.

The A/F mixture is compressed and then combusted by an ignition system 44 to drive pistons (not shown) which rotatably turn a crankshaft 46 generating drive torque. For example, the ignition system 44 may include one or more ignition coils that store and transfer energy to a plurality of spark plugs in the cylinders 40, respectively. Spark plugs, however, may not be implemented or may merely be used for spark assist in CI engines and HCCI engines, respectively. The drive torque may be transferred to a driveline 50 of the vehicle 12 via a transmission 48. For example, the transmission 48 may be coupled to the crankshaft 46 via a fluid coupling such as a torque converter. An electronic parking brake 52 includes an electric motor that engages an emergency brake (as opposed to a mechanical handle in the vehicle 12) to slow or prevent rotation of the driveline 50.

Electronically assisted brakes 54 increase a pressure applied by a brake system to slow or prevent rotation of the driveline 50. For example, the electronically assisted brakes 54 may be applied based on sensor feedback (e.g., acceleration sensors) to prevent an accident such as when a driver loses control of the vehicle 12. Additionally, for example, the vehicle 12 may be one of an extended range electric vehicle (EREV) and a two-mode hybrid vehicle that includes electronically assisted brakes 54. A transmission output shaft speed (TOSS) sensor 56 measures a rotational speed of an output shaft of the transmission 48. For example, measurements of the TOSS sensor 56 may indicate vehicle speed. Alternatively, other sensors such as an anti-lock braking system (ABS) wheel sensor may be used to measure vehicle speed.

Exhaust gas resulting from combustion is expelled from the cylinders 40 into an exhaust manifold 58. The exhaust gas may be treated by an exhaust treatment system (ETS) 60 to remove particulates and/or decrease emissions before being released into the atmosphere. For example, the ETS 60 may include at least one of oxidation catalysts (OCs), nitrogen oxide (NOx) absorbers/adsorbers, selective catalytic reduction (SCR) systems, particulate matter (PM) filters, and three-way catalytic converters.

The control module 20 controls operation of the engine system 30. The control module 20 may receive signals from the VSP 14 (via the communication channel 16 and the communication module 18), the throttle 36, the fuel injectors 42, the ignition system 44, the transmission 48, the electronic parking brake 52, the electronically assisted brakes 54, the TOSS sensor 56, and/or the ETS 60. The control module 20 may control the throttle 36, the fuel injectors 42, the ignition system 44, the transmission 48, the electronic parking brake 52, the electronically assisted brakes 54, and/or the ETS 60. The control module 20 may also implement the system or method of the present disclosure.

Figure 3:
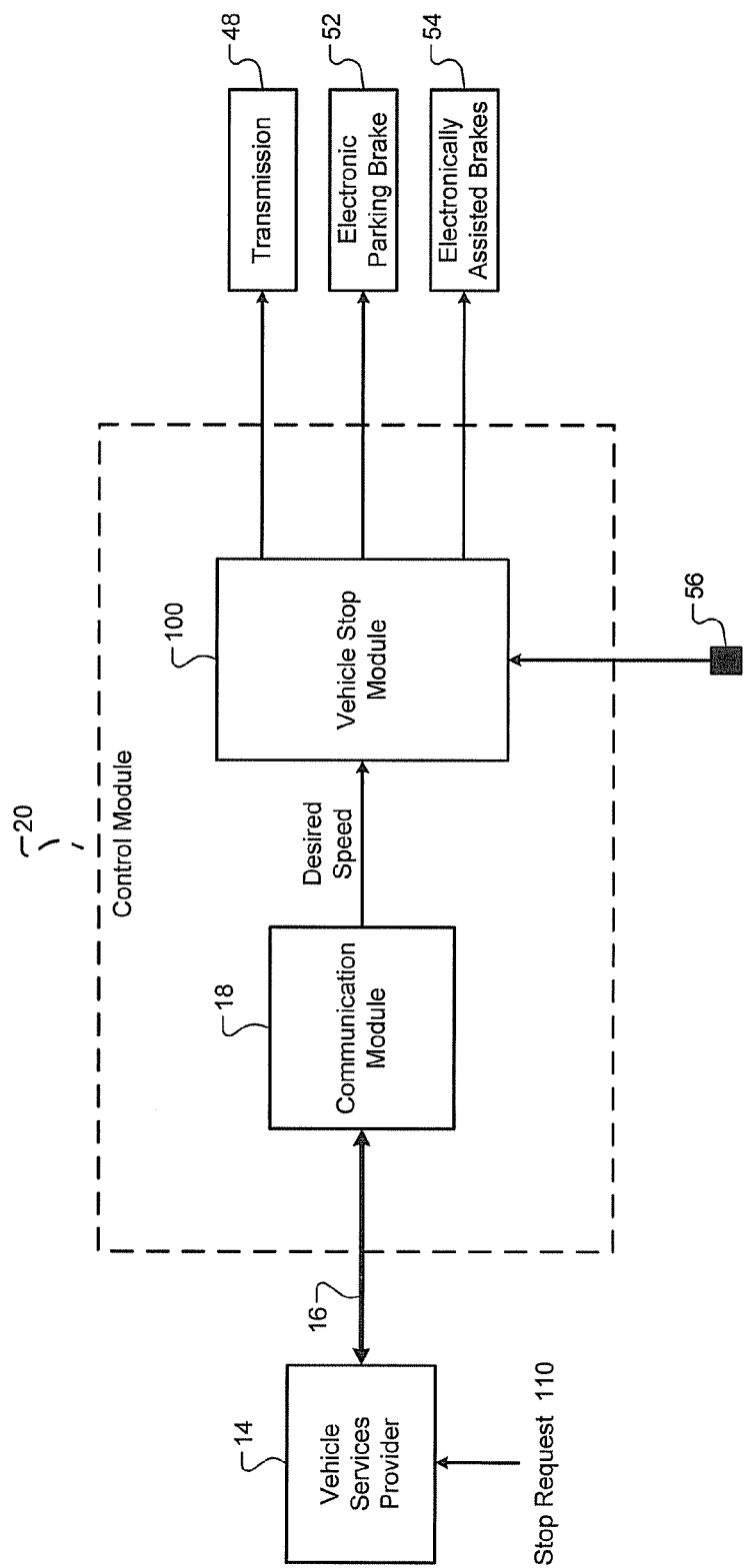
FIG. 3 is a functional block diagram of a control module of the vehicle according to one implementation of the present disclosure.

Referring now to FIG. 3, the control module 20 includes the communication module 18 and a vehicle stop module 100. As previously described with respect to FIG. 1, the communication module 18 communicates with the VSP 14. Specifically, the communication module 18 may receive a command from the VSP 14 (represented by stop request 110) to decrease the speed of the vehicle 12 to a desired speed. For example, the desired speed may be zero mph. The VSP 14 may transmit the command to decrease vehicle speed in response to a request from the owner of the vehicle 12 and/or in response to a request from law enforcement authorities.

The vehicle stop module 100 may receive the command to decrease the vehicle speed to the desired speed. When the command is received, the vehicle stop module 100 may control at least one of a plurality of components of the engine system 30 to decrease the vehicle speed. Specifically, the vehicle stop module 100 may control at least one of the transmission 48, the electronic parking brake 52, and the electronically assisted brakes 54. The vehicle stop module 100 may also decrease the speed of the vehicle 12 using other suitable methods such as controlling engine torque.

For example, the vehicle stop module 100 may shift the transmission 48 into neutral to prevent drive torque from being transferred to the driveline 50 of the vehicle 12. Additionally, for example, the vehicle stop module 100 may also apply at least one of the electronic parking brake 52 and the electronically assisted brakes 54 to decrease the vehicle speed. The vehicle stop module 100 may also control more than one of the plurality of components to decrease the vehicle speed. For example only, the vehicle stop module 100 may shift the transmission 48 into neutral and apply the electronically assisted brakes 54. Moreover, the capability of the vehicle stop module 100 to apply braking force to the vehicle 12 may also prevent the vehicle 12 from rolling backwards down a graded surface after the desired speed (e.g., zero mph) has been reached.

Figure 4:
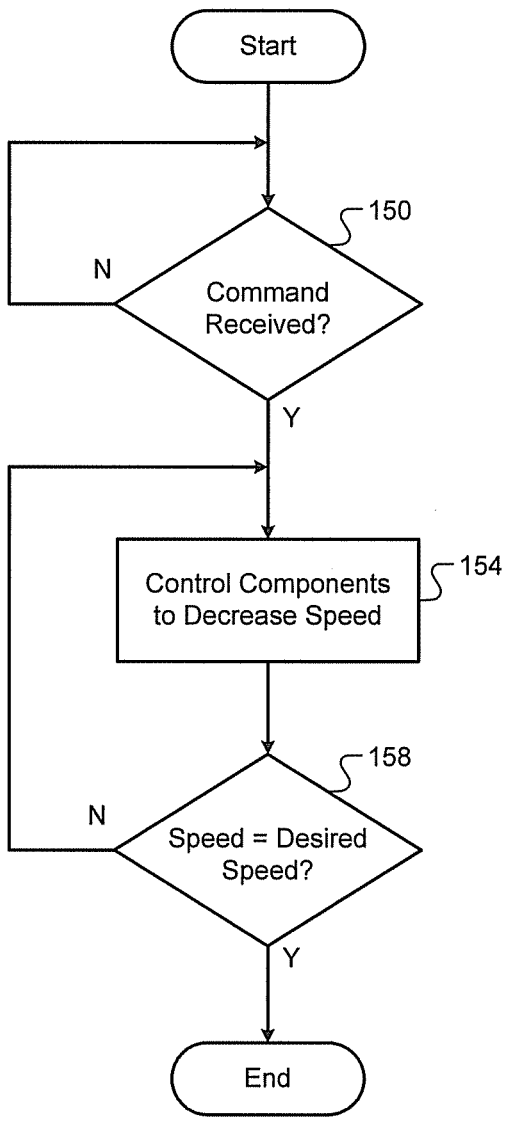
FIG. 4 is a flow diagram of a method for decreasing vehicle speed from a remote location according to one implementation of the present disclosure.

Referring now to FIG. 4, a method for decreasing vehicle speed from a remote location begins at 150. At 150, the control module 20 determines whether a valid command to decrease vehicle speed to a desired speed has been received from the VSP 14. For example, a valid command may be a command transmitted by an authorized source (e.g., the owner or law enforcement authorities). If true, control may proceed to 154. If false, control may return to 150.

At 154, the control module 20 controls at least one of the plurality of components to decrease the vehicle speed. At 158, the control module 20 determines whether the vehicle speed equals the desired vehicle speed. If false, control may return to 158. If true, control may end. Additionally before control ends, the control module 20 may send a response to the VSP 14 to notify the VSP 14 that the vehicle 12 has been stopped. The control module 20, however, may also continue communication with the VSP 14 to assist in locating the vehicle 12 after control ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, comprising:
a communication module that receives a command from a vehicle services provider (VSP) to decrease a speed of the vehicle to a desired speed, wherein the VSP is located remotely with respect to the vehicle; and
a vehicle stop module that, in response to the received command, decreases the speed of the vehicle to the desired speed by shifting a transmission into a neutral gear ratio.

2. The control system of claim 1, wherein the vehicle stop module decreases the vehicle speed by engaging the electronic parking brake.

3. The control system of claim 1, wherein the vehicle stop module decreases the vehicle speed by controlling at least one of an electronic parking brake and electronically assisted brakes.

4. The control system of claim 3, wherein the vehicle stop module decreases the vehicle speed by increasing a pressure applied by the electronically assisted brakes.

5. The control system of claim 1, wherein the vehicle stop module further decreases the vehicle speed by controlling engine torque.

6. The control system of claim 1, wherein the desired speed is zero miles per hour.

7. The control system of claim 1, wherein the communication module receives the command from the VSP via a wireless communication channel.

8. The control system of claim 1, wherein the VSP transmits the command to the communication module in response to a request by an owner of the vehicle.

9. The control system of claim 1, wherein the VSP transmits the command to the communication module in response to a request by law enforcement authorities.

10. The control system of claim 1, wherein the vehicle is one of an extended range electric vehicle (EREV) and a two-mode hybrid vehicle.

11. A method for controlling a vehicle, comprising:
receiving a command from a vehicle services provider (VSP) to decrease a speed of the vehicle to a desired speed, wherein the VSP is located remotely with respect to the vehicle; and
in response to the received command, decreasing the speed of the vehicle to the desired speed by shifting a transmission into a neutral gear ratio.

12. The method of claim 11, wherein decreasing vehicle speed includes engaging the electronic parking brake.

13. The method of claim 11, wherein decreasing the vehicle speed includes controlling at least one of an electronic parking brake and electronically assisted brakes.

14. The method of claim 13, wherein decreasing the vehicle speed includes increasing a pressure applied by the electronically assisted brakes.

15. The method of claim 11, wherein decreasing the vehicle speed further includes controlling engine torque.

16. The method of claim 11, wherein the desired speed is zero miles per hour.

17. The method of claim 11, wherein the command is received from the VSP via a wireless communication channel.

18. The method of claim 11, further comprising transmitting the command from the VSP to the vehicle in response to a request by an owner of the vehicle.

19. The method of claim 11, further comprising transmitting the command from the VSP to the vehicle in response to a request by law enforcement authorities.

20. The method of claim 11, wherein the vehicle is one of an extended range electric vehicle (EREV) and a two-mode hybrid vehicle.

* * * * *